United States Patent [19]

Hofmann

[11] Patent Number: 4,963,863
[45] Date of Patent: Oct. 16, 1990

[54] BROADBAND SIGNAL SWITCHING EQUIPMENT

[75] Inventor: Ruediger Hofmann, Gilching, Fed. Rep. of Germany

[73] Assignee: Siemens Aktiengesellschaft, Berlin and Munich, Fed. Rep. of Germany

[21] Appl. No.: 258,020

[22] Filed: Oct. 14, 1988

[30] Foreign Application Priority Data

Oct. 14, 1987 [DE] Fed. Rep. of Germany ....... 3734824

[51] Int. Cl.$^5$ .............................................. H04Q 3/00
[52] U.S. Cl. .................... 340/825.880; 340/825.79; 340/825.91
[58] Field of Search ...................... 340/825.79, 825.88, 340/825.89, 825.91, 825.9, 825.87, 825.93; 379/291, 292, 306.54; 307/465, 468, 448, 481, 241, 571, 279, 272.2

[56] References Cited

U.S. PATENT DOCUMENTS

| | | | |
|---|---|---|---|
| 3,609,661 | 9/1971 | Hennes et al. | 340/825.91 |
| 3,980,831 | 9/1976 | Mertel . | |
| 4,417,245 | 9/1981 | Melas et al. | 340/827 |
| 4,496,857 | 1/1985 | Chao . | |
| 4,611,204 | 9/1986 | Draayer | 340/825.8 |
| 4,785,299 | 11/1988 | Trumpp . | |
| 4,792,801 | 12/1988 | Hofmann | 340/825.79 |
| 4,839,643 | 6/1989 | Koenig et al. | 340/825.91 |

FOREIGN PATENT DOCUMENTS

0073920A2  7/1982  European Pat. Off. .

OTHER PUBLICATIONS

Karp, "Dynamic Refresh Memories", IEEE Digest, 3-22-71, pp. 36-37.
Chu et al., "Low Power High Speed Sense Latch", IBM Technical Disclosure Bulletin, vol. 17, No. 9, 02-1975, pp. 2582-2583.
Sunazawa et al., "Wideband Integrated Crosspoint Switch Matrix", Review of the Electrical Communications Laboratories, vol. 25, Nos. 1-2, Jan.-Feb., 1977, pp. 43-51.
Abbott, "Digital Space Division-A Technique for Switching High-Speed Data Signals", IEEE Communications Magazine, vol. 22, No. 4, 04-1984, pp. 32-38.
"Studies on Space-Division Digital Switching Networks" by Noriyoshi Kuroyanagi, in Electronics & Communications, Japan, vol. 53-A, No. 10, 1970, pp. 54-62.
"MOSIC Crosspoint Switch for Space Division Digital Switching Networks" by Yasuo Ohmori et al., Jul. 19, 1973, pp. 142-147.
"Architectural & Technology Aspects of Broadband Switching" by H. Bauch et al., from ISS Florence, May 1984, Session 23 C. Paper, pp. 1-7.
"Integrated Crosspoint Technology for Wide Band Space Division Switching Networks" by C. Duret et al., ISS Florence, May 1984, Session 31 C Paper, pp. 1-6.
"Arbeitsgeschwindigkeitsgrenzen von Koppelnetzwerken Fur Breitband-Ditigalsignale," by Pfannschmidt et al., Jun. 29, 1978, pp. 118-125.

*Primary Examiner*—Donald J. Yusko
*Assistant Examiner*—Edwin C. Holloway, III

[57] ABSTRACT

In a broadband signal switching equipment having crosspoint matrix using FET technology devices crosspoint-associated storage memory cells that control switching elements are each formed with two cross-coupled n-MOS inverter circuits each of which has its input side connected via a selection transistor to a selection line that carries a non-inverted and an inverted selection signal of one selection direction, respectively. Both selection transistors receive on their control electrodes the selection signal of the other selection direction. The control electrodes of two load transistors of the two cross-coupled n-channel inverter circuits are connected to the selection line that carries the inverted selection clock signal of the other selection direction. An additional driver transistor of the same channel type as two driver transistors in the two cross-coupled n-channel inverter circuits is inserted between the two drive transistors of the two cross-coupled n-channel inverter circuits and ground or a feed potential terminal. The control electrode of this additional driver transistor is connected to the selection line that carries the inverted selection clock signal of the other selection direction.

9 Claims, 2 Drawing Sheets

BROADBAND SIGNAL SWITCHING EQUIPMENT

BACKGROUND OF THE INVENTION

The present invention relates in general to broadband signal switching equipment using crosspoint technology. Recent developments in telecommunications technology have led to integrated services communications transmission and switching systems for narrowband and broadband communications services in which light waveguides are used as a transmission medium in the region of the subscriber lines. Both the narrowband communications services such as 64-Kbit/s digital telephony as well as broadband communications services such as, 140Mbit/s picture telephony, are conducted via these light waveguides. In prior art systems narrowband signal switching equipment and broadband signal switching equipment are provided side-by-side (as disclosed in German Patent No. 24 21 002) in the switching centers and preferably have shared control equipment.

In conjunction with broadband signal time-division multiplex switching equipment whose crosspoints are utilized in time-division multiplex for a plurality of connections, it is known to connect two lines by a gate element that is switched on and off by a cross point-associated memory cell. The memory cell may be a bistable D-trigger element, whereby this crosspoint-associated memory cell having a clock input supplied with a corresponding clock signal is driven in only one coordinate direction, namely at its D-input (see Pfannschmidt, "Arbeitsgeschwindigkeitsgrenzen von Koppelnetzwerken fuer Breitband-Digitalsignale", Diss., Braunschweig 1978, FIG. 6.7 as well as FIG. 6.4). In view of a time-division multiplex factor of about 4 through 8 which is achievable for a bit rate of 140 Mbit/s and in view of the complex circuit technology required, pure space division switching equipment are currently preferred for switching broadband signals. The connections formed by the individual crosspoints are separated only spatially from one another therein.

A pure broadband signal space division switching matrix network can be fashioned as a crosspoint network in CMOS technology provided with input amplifiers and output amplifiers, the switching elements in the crosspoints thereof being controlled by a decoder-controlled, crosspoint-associated storage memory cell, whereby the switching elements are fashioned as CMOS transfer gates (<for example see> CMOS transmission gates; ISS'84 Conference Papers 23Cl, FIG. 9). The crosspoint-associated storage memory cells of a pure space division switching matrix can be driven in two coordinates via a row-associated and a column-associated selection line connected to a row decoder and connected to a column decoder (for example see Pfannschmidt, op. cit., FIG. 6.4).

In broadband signal space coupling equipment having a crosspoint matrix using FET technology device, the switching elements can be formed with n-channel-,1 transistors having their drain-source path connected between a matrix input line and a matrix output line (also see ISS'84 Conference Papers 31.C.3, FIG. 12). Each of these n-channel transistors are controlled by a cross-point-associated memory cell that is driven in two coordinates by two selection decoders. The elements have two cross-coupled inverter circuits wherein one of the inverters has its input side connected to an inverting decoder output of one selection decoder via a first n-channel transistor and wherein the other of the inverters has its input side connected to a non-inverting decoder output of the same selection decoder via a second n-channel transistor. Both n-channel transistors in turn have their control electrode receiving an output signal of a connected decoder output of another selection decoder (see Rev. ECL 25 (1977) 1-2, 43...51, FIG. 1; IEE J. of Solid-State Circuits SC-9 (1974) 3, 142...147, FIG. 1(a); Electronics and Communications in Japan, 53-A (1970) 10, 54...62, FIG. 5(b); and EP-A-0 073 920, FIG. 4). Every writing of such a known memory cell requires that a write current having a defined magnitude be applied for a defined time, this producing corresponding losses in writing performance and rewriting durations.

Compared thereto, it is an object to the present invention to provide in a broadband switching equipment individual crosspoint-associated memory cells which have low dissipated writing power and short switching times.

SUMMARY OF THE INVENTION

The present invention is directed to a broadband signal switching equipment having a crosspoint matrix which uses FET technology devices and whose switching elements are controlled by crosspoint-associated storage memory cells that are driven in two coordinates and that are formed by two cross-coupled MOS inverter circuits. One of the inverters has its input side connected via a first selection transistor to a selection line carrying a non-inverted selection signal of one selection direction and the other has its input side connected via a second selection transistor to a selection line carrying an inverted selection signal of the same selection direction. Both selection transistors in turn have their control- electrodes receiving a selection signal of another selection direction. This space division switching equipment is inventively characterized in that the control electrodes of the two load transistors of the two cross-coupled n-channel inverter circuits are connected to the selection line carrying the inverted selection clock signal of the other selection direction. In a further development of the present invention, an additional driver transistor of the same channel type as the channel type of two driver transistors in the two cross-coupled n-channel inverter circuits can be inserted between the two driver transistors of the two cross-coupled n-channel inverter circuits and ground or a feed potential terminal. The control electrode of this additional driver transistor is likewise connected to the selection line carrying the inverted selection clock signal of the said other selection direction.

The present invention has the advantages that the crosspoint-associated storage memory cells that are provided in a crosspoint matrix are selected in two coordinate directions currentless in the selection phase. They are thus able to avoid power dissipations that otherwise occur in prior art circuits. Short switching (writing) times additional result.

BRIEF DESCRIPTION OF THE DRAWINGS

The features of the present invention which are believed to be novel, are set forth with particularity in the appended claims. The invention, together with further objects and advantages, may best be understood be reference to the following description taken in conjunction with the accompanying drawings, in the several Figures in which like reference numerals identify like elements, and in which:

DESCRIPTION OF THE PREFERRED EMBODIMENTS

Figure 1:
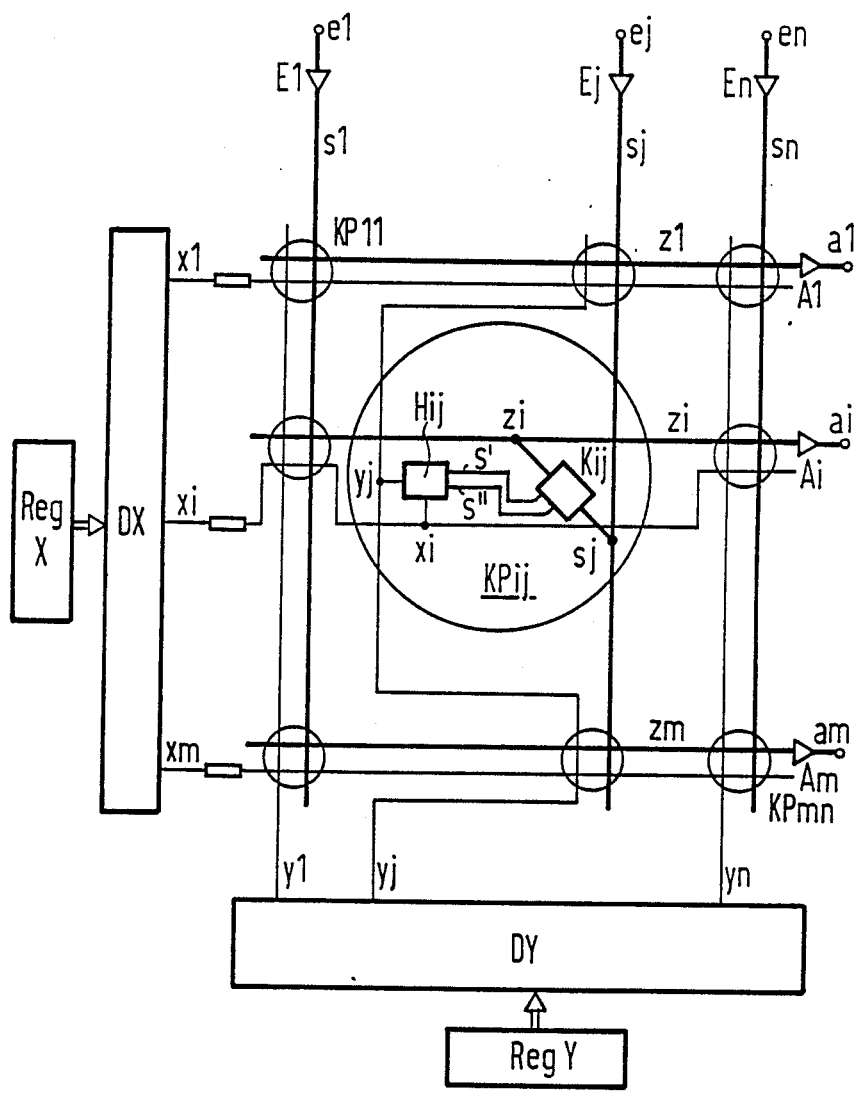
FIG. 1 is a diagram of a broadband switching equipment.

FIG. 1 of the drawings schematically shows a broadband signal switching equipment in which the present invention is utilized. The equipment has inputs e1...ej...en connected to column lines s1...sj...sn of a crosspoint matrix. Input driver circuits E1...Ej...En are provided as shown in FIG. 1. Outputs a1...ai...am are connected to row lines z1...zi...zm of the crosspoint matrix by output amplifier circuits A1...Ai...Am. The crosspoint matrix has crosspoints KP11...KPij...KPmn whose switching elements, as indicated in greater detail at crosspoint KPij for the switching element Kij, can each controlled by a crosspoint-associated storage memory cell Hij (at crosspoint KPij) whose outputs s', s" are connected to the control input of the respective switching element (Kij at crosspoint KPij).

According to FIG. 1, the storage memory cells, such as Hij, are selected in two coordinates by two selection decoders, namely a line decoder DX and a column decoder DY. The memory cell is selected via corresponding selection lines x1...xi...xm and y1...jy...jn. As may be seen from FIG. 1, the two selection decoders DX, DY receive from input registers Reg X, Reg Y, respectively, a crosspoint, row crosspoint column address, respectively, thereby identifying a matrix line row and a matrix line column of the crosspoints. In response the two selection decoders DX, DY respectively output a "1" selection signal to the respective selection line corresponding to the crosspoint line address. The coincidence of a row selection signal "1" and of a column selection signal "1" at the intersection of the associated matrix row with the associated matrix column during set-up of a connection then effects an activation of the storage memory cell located there, for example the holding memory cell Hij. As a result the switching element controlled by the associated storage memory cell of Hij, the switching element Kij in the example, becomes conductive.

In order to reset the switching element Kij, during a clear down of the associated connection, the selection decoder Dy again receives the column address from the input register Reg Y, so that the column decoder DY again outputs a column selection signal "1" on its output line yji. Simultaneously, the row decoder Dx receives from its input register Reg X a dummy address or the address of a row of nonconnected crosspoints, so that it outputs a row selection signal "0" on its output line xi. The coincidence of column selection signal "1" and row selection signal "0" then effects the resetting of the storage memory cell Hij, with the result that the switching element Kij controlled by it becomes nonconductive. The switching elements Kij, provided in the crosspoints KPij, can be realized in a known way as disclosed, for example, by patent references EP-A-0 219 848, EP-A-0 221 490, EP-A-0 238 834, German Patent No. 3 631 634 or German Patent No. 3 634 154 and therefore need not be set forth in greater detail here. How the storage memory cells, Hij, can be realized in terms of circuit technology shall be shown in FIG. 2 and in FIG. 3.

Figure 2:
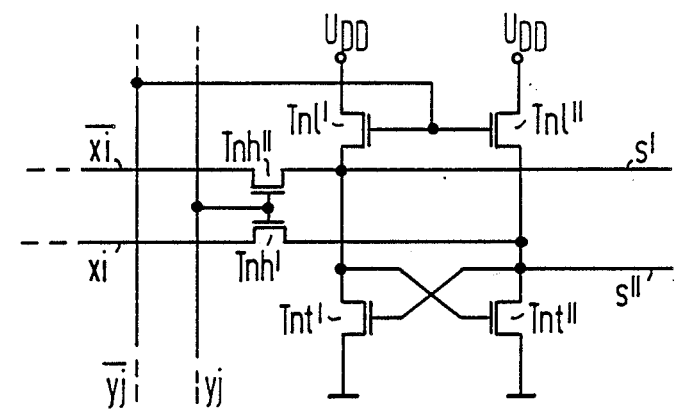
FIG. 2 and 3 are circuit diagrams of details of a circuit realization of the present invention.
Figure 3:
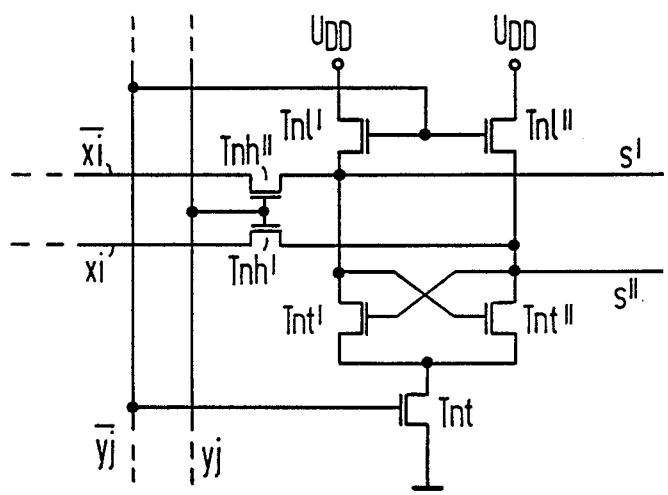

As may be seen from FIG. 2 and from FIG. 3, each of the crosspoint-associated storage memory cells Hij selectable in two coordinates is formed with two cross-coupled NMOS inverter circuits Tnl', Tnt' and Tnl", Tnt" wherein one of the inverter circuits (also referred to as an inverter) as the (Tnl', Tnt') has its input side connected via a first selection transistor Tnh' to a selection line xi that carries a non-inverted selection signal of one selection direction and wherein the other of the inverters (Tnl", Tnt") has its input side connected via a second selection transistor Tnh" to a selection line $\overline{xi}$ that carriers an inverted selection signal of the same selection direction. The two n-channel selection transistors Tnh' and Tnh" receive on their control electrode non-inverted selection signal of the other selection direction proceeding from a selection line yj.

In the storage memory cell Hij set forth in FIG. 2, the control electrodes of the two load transistors Tnl' and Tnl" are connected to a selection line $\overline{yj}$ that carries an inverted selection clock signal of the other selection direction.

Controlled by the "0" signal of, for example, zero volts appearing on the selection clock line $\overline{yj}$ during a selection (write phase) of the storage memory cell Hij, the two load transistors Tnl' and Tnl" are rendered nonconductive and thus switch off the operating voltage of the cross-coupled NMOS inverter circuits Tnl', Tnt' and Tnl", Tnt" for the duration of the -write phase, so that the cross-coupled NMOS inverter circuits are currentless. At the same time during the selection phase, the non-inverted selection signal appearing on the selection line xi and the inverted selection signal appearing on the selection line $\overline{xi}$ place the storage memory cell Hij in the switch status corresponding to this selection signal. The storage memory cell Hij remains in the switch status pre-set in this way during the write phase when, subsequent thereto at the end of the write phase, a "0" signal (for example 0 volts) that inhibits the selection transistors again appears on the selection line yj instead of a "1" signal (for example +5 volts) that drives the selection transistors Tnh', Tnh" into their conductive condition and, conversely, a "1" signal again appears on the selection line $\overline{yj}$, so that the NMOS inverter circuits again become current conducting.

To this extent, the storage memory cell Hij outlined in FIG. 3 coincides with that of FIG. 2. However, included in FIG. 3 is an additional driver transistor Tnt of the same channel type channel type of the two driver transistors Tnt' and Tnt" which is inserted between the two n-channel driver transistors Tnt' and Tnt" and feed potential terminal (ground). The control electrode of this additional driver transistor Tnt is likewise connected to the selection line $\overline{yj}$ that carries the inverted selection clock signal of the said other selection direction. The storage memory cell Hij of FIG. 3 then initially operates analogously to the storage memory cell of FIG. 2; controlled by the "0" signal of, for example, 0 volts appearing on the selection line $\overline{yjx}$ the additional driver transistor Tnt is also placed into its nonconductive condition during a selection (write phase) of the storage memory cell Hij and thus also in turn disconnects the operating voltage of the cross-coupled NMOS inverter circuits Tnl', Tnt' and Tnl", Tnt" for the duration of the write phase, so that the cross-coupled inverter circuits are currentless. At the same time during the selection phase, the inverted selection signal appearing on the selection line $\overline{xi}$ and the non-inverted selection signal appearing on the selection line xi simultaneously place the storage memory cell Hij into the switch status corresponding these selection signal. The storage memory cell Hij per-set in this fashion during the write phase remains in this switch condition when, subsequently thereto with the conclusion of the write phase, a "1" signal (+5 volts) again appears on the selection line $\overline{yi}$ and the additional driver transistor Tnt again becomes conductive.

The complete separation of the two cross-coupled NMOS inverter circuits Tnl', Tnt' and Tnl", Tnt" from the two feed voltage terminals ($U_{DD}$ and ground) thereby allows an especially short and at the same time, reliable selection phase (write phase) of the storage memory cell Hij.

In addition to the complementary signal selection of the storage memory cell Hij via the two selection lines xi, $\overline{xi}$ of the one selection direction, a complementary signal clocking of the storage memory cell with the non-inverted and with the inverted selection clock signal of the other selection direction also takes place according to FIG. 2 and FIG. 3 via the two selection lines yj, $\overline{yj}$ Let it be noted in this context that the inverted selection signal $\overline{xi}$ or $\overline{yj}$ required for such a complementary selection can be respectively conducted through the switching equipment on a separate line, as is likewise indicated in FIG. 2 and in FIG. 3. Alternatively it is also possible to individually acquire the respective, inverted selection signal ($\overline{xi}$ or $\overline{yj}$ at every crosspoint by inverting the respective noninverted selection signal (xi or yj). This however, need not be shown here in greater detail since it is not required for an understanding of the invention.

The invention is not limited to the particular details of the apparatus depicted and other modification and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A broadband signal switching equipment having a crosspoint matrix using FET technology devices whose switching elements are controlled by crosspoint-associated storage memory cells (Hij) driven in two coordinates each of which is formed by two cross-coupled MOS inverter circuits (Tnl', Tnt'; Tnl") wherein one of the inverter circuits (Tnl', Tnt') has its input side connected via a first selection transistor (Tnh') to a selection line (xi) that carries a non-inverted selection signal of one selection direction and wherein the other of the inverter circuits (Tnl", Tnt") has its input side connected via a selection transistor (Tnh") to a selection line i)/ that carries an inverted selection signal of the same selection direction, both selection transistors (Tnh', Tnh") receiving on their control electrodes a selection signal of the other selection direction, comprising control electrodes of two load transistors (Tnl'; Tnl") of the two cross-coupled inverter circuits being connected to a selection line j)/ that carries an inverted selection clock signal of the other selection direction.

2. The broadband signal switching equipment according to claim 1, wherein an additional driver transistor (Tnt) of the same channel type as a channel type of two driver transistors (Tnt'; Tnt") in the two cross-coupled inverter circuits, the two driver transistors having the same channel type, is connected between the two driver transistors (Tnt'; Tnt") of the two cross-coupled inverter circuits and a feed potential terminal, a control electrode of said additional driver transistor being connected to the selection line j)/ that carries the inverted selection clock signal of the other selection direction.

3. The broadband signal switching equipment according to claim 1, wherein the cross-coupled MOS inverter circuits are n-channel inverter circuits.

4. The broadband signal switching equipment having a crosspoint matrix using FET technology devices whose switching elements are controlled by crosspoint-associated storage memory cells driven in two coordinates each of which is formed by first and second cross-coupled MOS inverter circuits wherein the first inverter circuit has an input side connected via a first selection transistor to a selection line (xi) that carries a non-inverted selection signal of one selection direction and wherein the second inverter circuit has an input side connected via a second selection transistor to a selection line i)/ that carries an inverted selection signal of the same selection direction, each of said first and second selection transistors having a control electrode connected to a selection line (yi) that carries a selection signal of the other selection direction, comprising control electrodes of two load transistors in the two cross-coupled inverter circuits being connected to a selection line j)/ that carries an inverted selection signal of the other selection direction.

5. The broadband signal switching equipment according to claim 4, wherein an additional driver transistor is connected between two driver transistors of the two cross-coupled inverter circuits and a feed potential terminal, a control electrode of said additional driver transistor being connected to the selection line j)/ that carries the inverted selection signal of the other selection direction.

6. The broadband signal switching equipment according to claim 5, wherein the additional driver transistor is of the same channel type as the two driver transistors, the two driver transistors having the same channel type.

7. The broadband signal switching equipment according to claim 4, wherein the cross-coupled MOS inverter circuits are n-channel inverter circuits.

8. The broadband signal switching equipment having a crosspoint matrix using FET technology devices whose switching elements are controlled by crosspoint-associated storage memory cells driven in two coordinates each of which is formed by first and second cross-coupled MOS n-channel inverter circuits wherein the first inverter circuit has an input side connected via a first selection transistor to a selection line (xi) that carries a non-inverted selection signal of one selection direction and wherein the second inverter circuit has an input side connected via a second selection transistor to a selection line i)/ that carries an inverted selection signal of the same selection direction, each of said first and second selection transistors having a control electrode connected to a selection line (yi) that carries a selection signal of the other selection direction, comprising control electrodes of two load transistors in the two cross-coupled inverter circuits being connected to a selection line j)/ that carries an inverted selection signal of the other selection direction, and an additional driver transistor connected between two driver transistors in the two cross-coupled inverter circuits and a feed potential terminal, a control electrode of said additional driver transistor being connected to the selection line j)/ that carries the inverted selection signal of the other selection direction, said additional driver transistor being of the same channel type as the two driver transistors, the two driver transistors having the same channel type.

9. The broadband signal switching equipment according to claim 8, wherein said non-inverted and inverted selection signals of both said selection directions are clock signals.

* * * * *